United States Patent
Li et al.

(10) Patent No.: US 10,787,753 B2
(45) Date of Patent: Sep. 29, 2020

(54) ANODIZED SUBSTRATES WITH DARK LASER MARKINGS

(71) Applicant: Apple Inc., Cupertino, CA (US)

(72) Inventors: Michael M. Li, San Jose, CA (US); Henry B. Wettersten, San Francisco, CA (US); Brian M. Gable, San Jose, CA (US); Dakota A. Bass, Grover Beach, CA (US)

(73) Assignee: APPLE INC., Cupertino, CA (US)

( * ) Notice: Subject to any disclaimer, the term of this patent is extended or adjusted under 35 U.S.C. 154(b) by 541 days.

(21) Appl. No.: 15/379,316

(22) Filed: Dec. 14, 2016

(65) Prior Publication Data

US 2018/0073158 A1    Mar. 15, 2018

Related U.S. Application Data

(60) Provisional application No. 62/394,718, filed on Sep. 14, 2016.

(51) Int. Cl.
  *B23K 26/00*    (2014.01)
  *B23K 26/361*    (2014.01)
  (Continued)

(52) U.S. Cl.
  CPC .......... *C25D 11/022* (2013.01); *B23K 26/355* (2018.08); *B23K 26/361* (2015.10);
  (Continued)

(58) Field of Classification Search
  CPC .. B23K 26/352; B23K 26/355; B23K 26/361; B23K 26/362; C25D 11/04; C25D 11/022
  See application file for complete search history.

(56) References Cited

U.S. PATENT DOCUMENTS

| | | | |
|---|---|---|---|
| 6,916,524 | B1 | 7/2005 | Yeo |
| 2009/0041988 | A1* | 2/2009 | Ho .......... C25D 11/04 428/172 |

(Continued)

FOREIGN PATENT DOCUMENTS

| | | |
|---|---|---|
| EP | 1453667 A1 | 9/2004 |
| EP | 2683519 A1 | 1/2014 |

(Continued)

*Primary Examiner* — Lee E Sanderson
*Assistant Examiner* — Michael C Romanowski
(74) *Attorney, Agent, or Firm* — Dorsey & Whitney LLP

(57) ABSTRACT

Anodized substrates having laser markings and methods for forming the same are described. According to some embodiments, the methods involve forming a feature on a substrate using a laser prior to anodizing. The laser energy and pulse width can be chosen so as to provide a particular topology to a surface of the substrate that, after anodizing, absorbs incoming light and imparts a dark appearance to the feature. In some cases, the methods involve forming a coarse oxide layer, which is removed prior to anodizing. Since the laser marking is performed prior to anodizing, the anodized substrates are free from laser-induced cracks, thereby making the anodized substrates more corrosion resistant than conventional laser-marked anodized substrates. The techniques are well suited for forming features on consumer products that may be exposed to water or other corrosion-inducing agents.

20 Claims, 6 Drawing Sheets

(51) Int. Cl.
  *B23K 26/70* (2014.01)
  *C25D 11/02* (2006.01)
  *H05K 5/02* (2006.01)
  *H05K 5/04* (2006.01)
  *C25D 11/16* (2006.01)
  *B23K 26/362* (2014.01)
  *B23K 26/352* (2014.01)
  *C25D 11/24* (2006.01)
  *C25D 11/04* (2006.01)
  *B23K 103/10* (2006.01)

(52) U.S. Cl.
  CPC ............ *B23K 26/362* (2013.01); *C25D 11/16* (2013.01); *B23K 2103/10* (2018.08); *C25D 11/04* (2013.01); *C25D 11/243* (2013.01); *C25D 11/246* (2013.01)

(56) References Cited

U.S. PATENT DOCUMENTS

| | | | |
|---|---|---|---|
| 2011/0123737 A1 | 5/2011 | Nashner | |
| 2013/0291367 A1* | 11/2013 | Nashner | B23K 26/38 219/121.69 |
| 2014/0166490 A1* | 6/2014 | Tatebe | C25D 5/02 205/50 |
| 2015/0090373 A1* | 4/2015 | Gable | C22F 1/053 148/549 |
| 2015/0367443 A1 | 12/2015 | Nashner et al. | |
| 2017/0347476 A1* | 11/2017 | Hwang | C23C 16/44 |

FOREIGN PATENT DOCUMENTS

| | | |
|---|---|---|
| EP | 2922657 A1 | 9/2015 |
| WO | 2002083405 A1 | 10/2002 |
| WO | 2012121732 A1 | 9/2012 |
| WO | 2014080157 A1 | 5/2014 |

\* cited by examiner

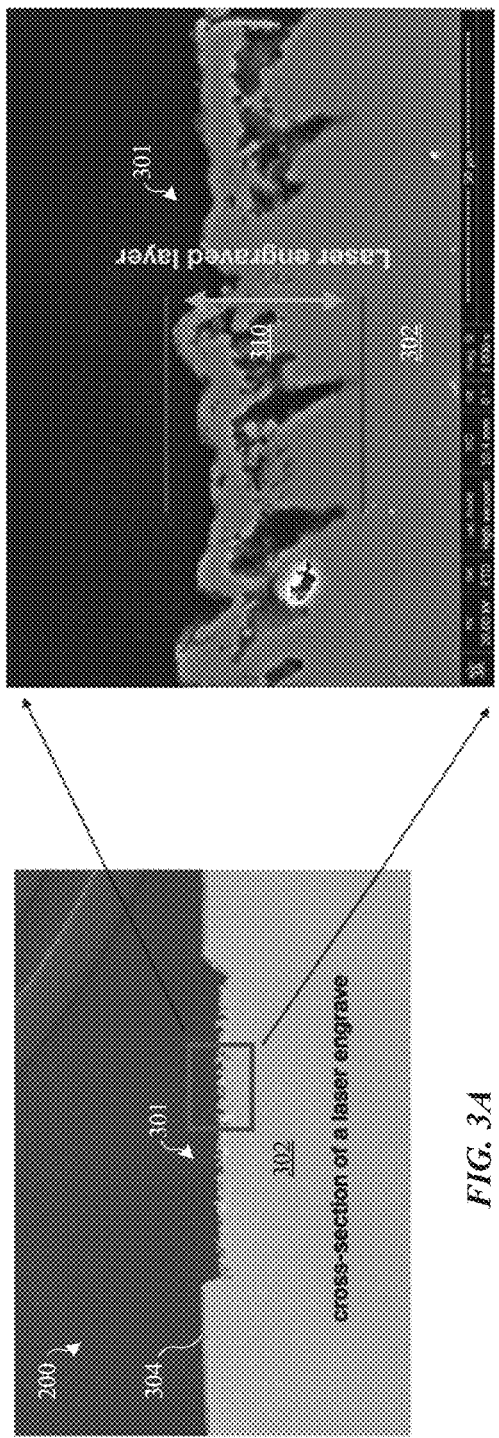
*FIG. 3A*
*FIG. 3B*
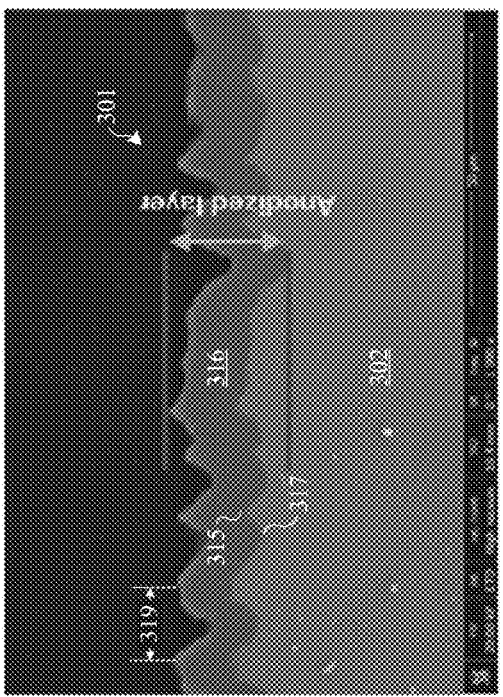
*FIG. 3C*

ANODIZED SUBSTRATES WITH DARK LASER MARKINGS

CROSS-REFERENCE TO RELATED APPLICATION

This application claims the benefit of U.S. Provisional Application No. 62/394,718, entitled "ANODIZED SUBSTRATES WITH DARK LASER MARKINGS" filed on Sep. 14, 2016, which is incorporated by reference herein in its entirety.

FIELD

The described embodiments relate to anodized substrates and methods for forming cosmetic features therein. Methods can include laser-marking techniques in combination with anodizing techniques.

BACKGROUND

Laser engraving techniques are commonly used in a number of industries to form marks, such as designs or logos, on objects that generally have a hard surface. This is partly because lasers can produce laser beams having high enough energy to mark many types of hard materials with great accuracy and control. One of the problems associated with using laser engraving techniques on anodized surfaces is that the overlying anodic films are relatively brittle. Applying a laser beam to anodized surfaces can cause the anodic films to crack due to thermal stress or strain applied during the marking process. These cracks within the anodic film can reduce the integrity of the anodic film and leave the underlying substrate prone to corrosion. This effect can be exacerbated when substrates are made of certain alloys that are more vulnerable to corrosion.

SUMMARY

This paper describes various embodiments that relate anodic films and methods of laser marking, engraving, ablating, or texturing the same. In particular embodiments, methods involve forming a textured surface on a substrate, followed by anodizing the substrate.

According to one embodiment, a part is described. The part includes an anodized substrate including an anodic film covering a substrate. The part also includes a feature defining a recessed area in the anodized substrate. An interface between the anodic film and the substrate has a series of peaks and valleys that impart a darker appearance to the feature relative to an adjacent area of the anodized substrate. A distance between the peaks is less than about 30 micrometers.

According to another embodiment, a method of forming a feature on a part is described. The method includes forming a recessed area on a substrate using a laser beam, thereby creating a coarse oxide layer over the substrate. The method also includes removing the coarse oxide layer to expose the surface of the recessed area of the substrate. The method further includes anodizing the recessed area of the substrate to form an anodic film on the recessed area. An interface between the anodic film and the recessed area includes a series of peaks and valleys that impart a darker appearance to the recessed area relative to an adjacent area of the substrate. A distance between the peaks (peak-to-peak) is less than about 30 micrometers.

According to a further embodiment, an enclosure for an electronic device is described. The enclosure includes an anodized aluminum substrate including an anodic film covering an aluminum substrate. The enclosure further includes a feature defining a recessed area in the anodized substrate. An interface between the anodic film and the aluminum substrate has a series of peaks and valleys that impart a darker appearance to the feature relative to an adjacent area of the anodized substrate. The feature is recessed into the anodized aluminum substrate by a depth ranging from about 4 micrometers and about 8 micrometers.

These and other embodiments will be described in detail below.

BRIEF DESCRIPTION OF THE DRAWINGS

The disclosure will be readily understood by the following detailed description in conjunction with the accompanying drawings, wherein like reference numerals designate like structural elements.

FIGS. 3A-3C show scanning electron microscope (SEM) cross-section images of a feature formed using a laser-marking process, in accordance with some embodiments.

DETAILED DESCRIPTION

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

Described herein are methods of forming features within anodized substrates. According to some embodiments, the methods involve marking the substrates prior to anodizing. In this way, the resulting anodic films will be free of laser-induced cracks, thereby providing better corrosion resistance to the underlying metal substrates. The laser-marking processes can be chosen so as to form a light-absorbing topology on the substrate such that the features have a dark appearance. The light-absorbing topology can include a series of peaks and valleys with a small enough pitch to prevent incident light from reflecting back to an observer. In some cases, the pitch is on the scale of tens of micrometers or less.

According to some embodiments, the laser marking techniques described herein include forming a coarse oxide layer that is very porous and has a very dark appearance in some cases a black appearance. Although this very dark appearance may be desirable for marking purposes, this coarse oxide layer may be easily rubbed off. Therefore, the coarse oxide layer can be removed using, for example, a chemical etching process, thereby revealing a rough substrate surface that retains some of the darkness due to a surface topology having very small-scale features. After anodizing, the rough substrate surface retains the surface topology—i.e., peaks and valleys having a pitch on the scale of tens of micrometers or less—which give the rough surface its dark appearance.

The laser marking processes described herein can be referred to as laser engraving, laser etching, or any other suitable term. The laser marking techniques are well suited for providing features (e.g., text, logos, symbols, or other suitable features) on consumer products. For example, the methods described herein can be used to form identifying marks or cosmetic features within anodized surfaces of housing of computers, portable electronic devices, wearable electronic devices, and electronic device accessories, such as those manufactured by Apple Inc., based in Cupertino, Calif.

These and other embodiments are discussed below with reference to FIGS. 1-4. However, those skilled in the art will readily appreciate that the detailed description given herein with respect to these Figures is for explanatory purposes only and should not be construed as limiting.

Figure 1:
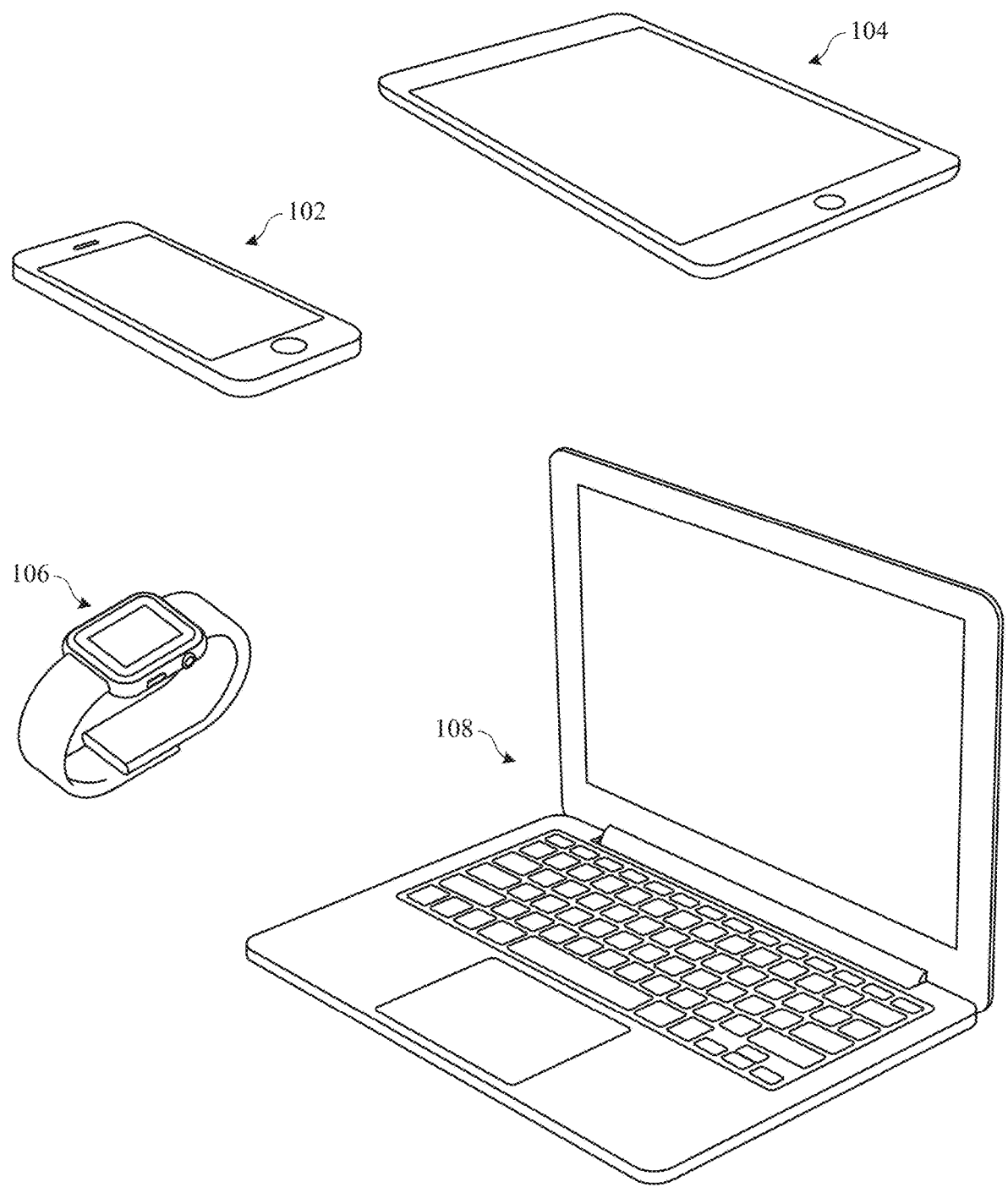
FIG. 1 shows perspective views of devices having metal surfaces that can have the markings described herein.

FIG. 1 shows consumer products than can include anodized substrates having features described herein. FIG. 1 includes portable phone 102, tablet computer 104, smart watch 106 and portable computer 108, each of which can include enclosures that are made of metal or have metal sections. In some cases, these metal enclosures are composed of aluminum or aluminum alloys. Aluminum alloys are often choice materials due to their strength, light weight and ability to anodize to form a cosmetically appealing an durable anodic oxide coating.

It is often desirable to create visible features on the enclosures of electronic devices 102, 104, 106 and 108 for decorative purposes, identifying purposes or both. Examples include text, logos, symbols, graphics or artwork. Traditional methods of forming such features within an anodized substrate include laser-marking techniques, where a laser beam is directed to through the anodic film and focused on the underlying substrate. This technique creates a darkened layer of material between the anodic film and the substrate. The darkened layer is visible through the anodic film and, thus, becomes the visible feature.

One of the problems associated with conventional laser-marking techniques is that the anodic film has a different thermal expansion coefficient than the underlying metal substrate. In addition, the anodic film is more brittle than the underlying metal substrate. Thus, when a laser beam locally heats the underlying metal substrate, the metal substrate expands faster than the overlying anodic film, thereby causing the anodic film to form micro-cracks. Although these micro-cracks can be small, they can act as pathways for water and other liquids to reach the underlying substrate, which can cause the underlying substrate to corrode.

This may be an important factor when it comes to consumer products, such as electronic devices 102, 104, 106 and 108. For example, portion of the enclosure of phone 102, tablet computer 104, watch 106 and portable computer 108 may be in contact with a user's skin, which may have perspiration, sunscreen, lotion or other agents. Furthermore, phone 102, tablet computer 104, watch 106 and portable computer 108 may be exposed to water splashes, etc. If the anodized surfaces of the enclosures of these products have cracks, even if they are too small to see, these cracks can allow moisture or other chemicals to pass through the protective anodic film and reach the underlying metal substrate, thereby increasing the likelihood of corrosion and cosmetic defects.

Methods described herein can be used to form cosmetic features on anodized surfaces, such as those of devices 102, 104, 106 and 108, that do not include forming laser-induced cracks within the anodic films. In particular embodiments, the methods involve use of a laser marking process on the metal substrate prior to performing an anodizing process.

Figure 2A:
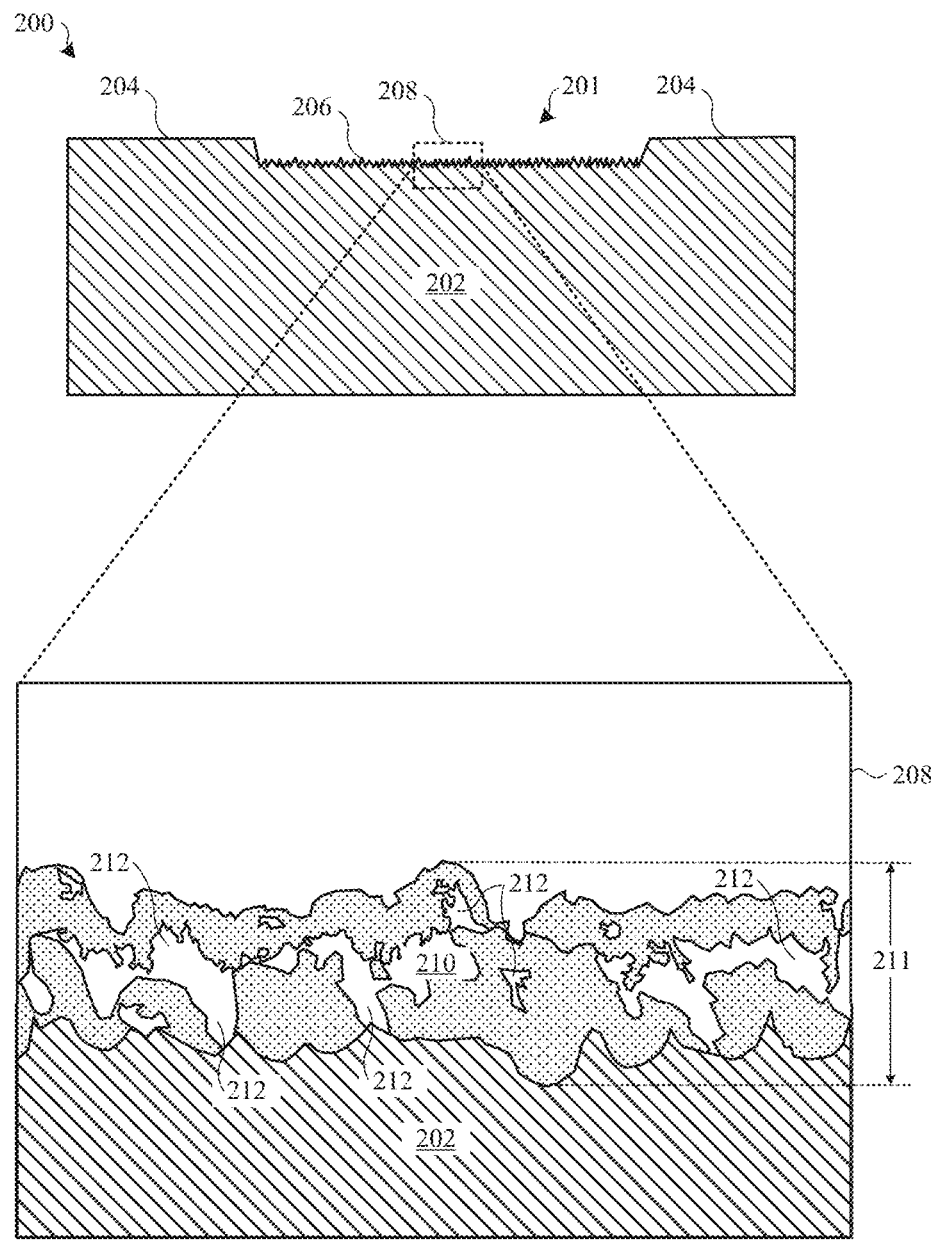
FIGS. 2A-2C show cross-section views of a part undergoing a laser marking process, in accordance with some embodiments.
Figure 2B:
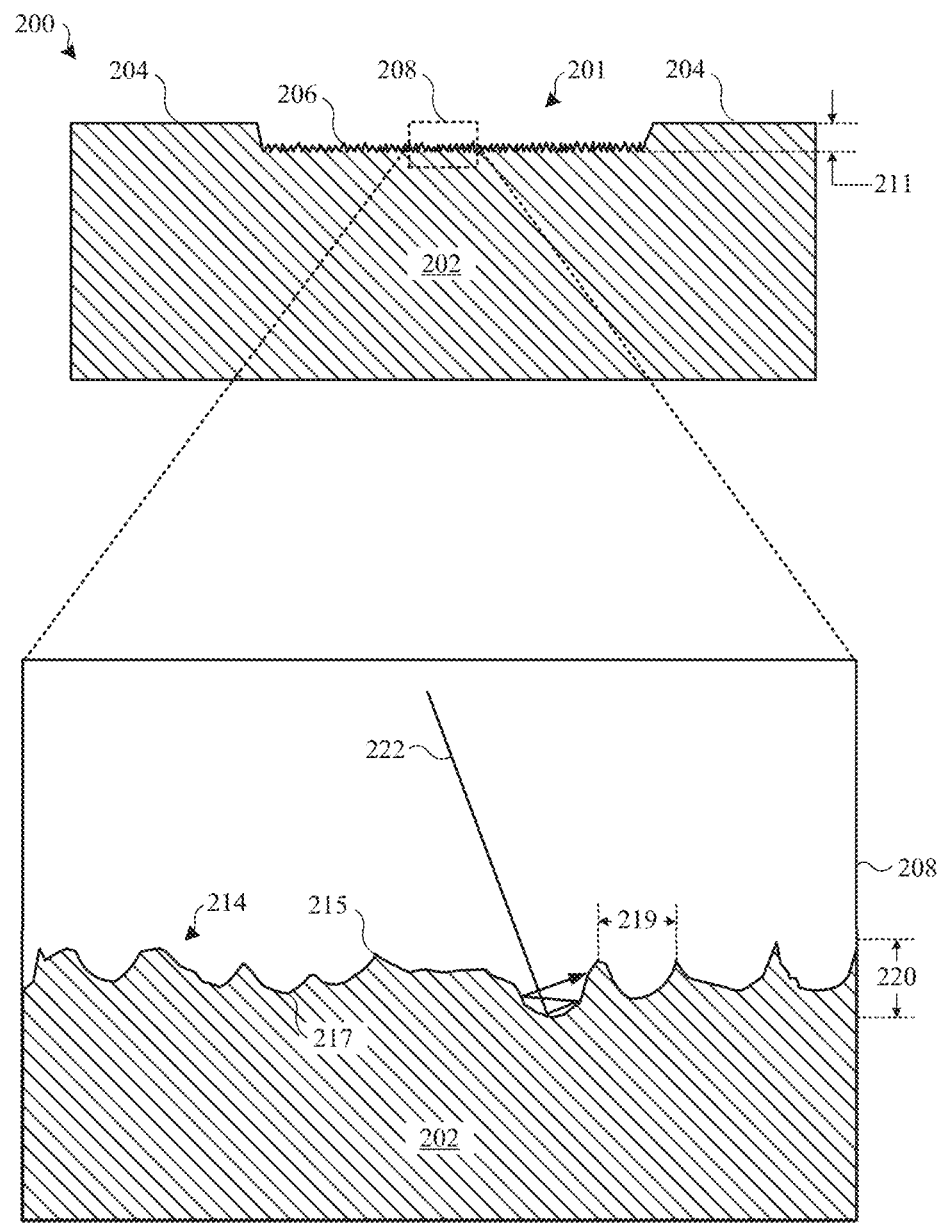
Figure 2C:
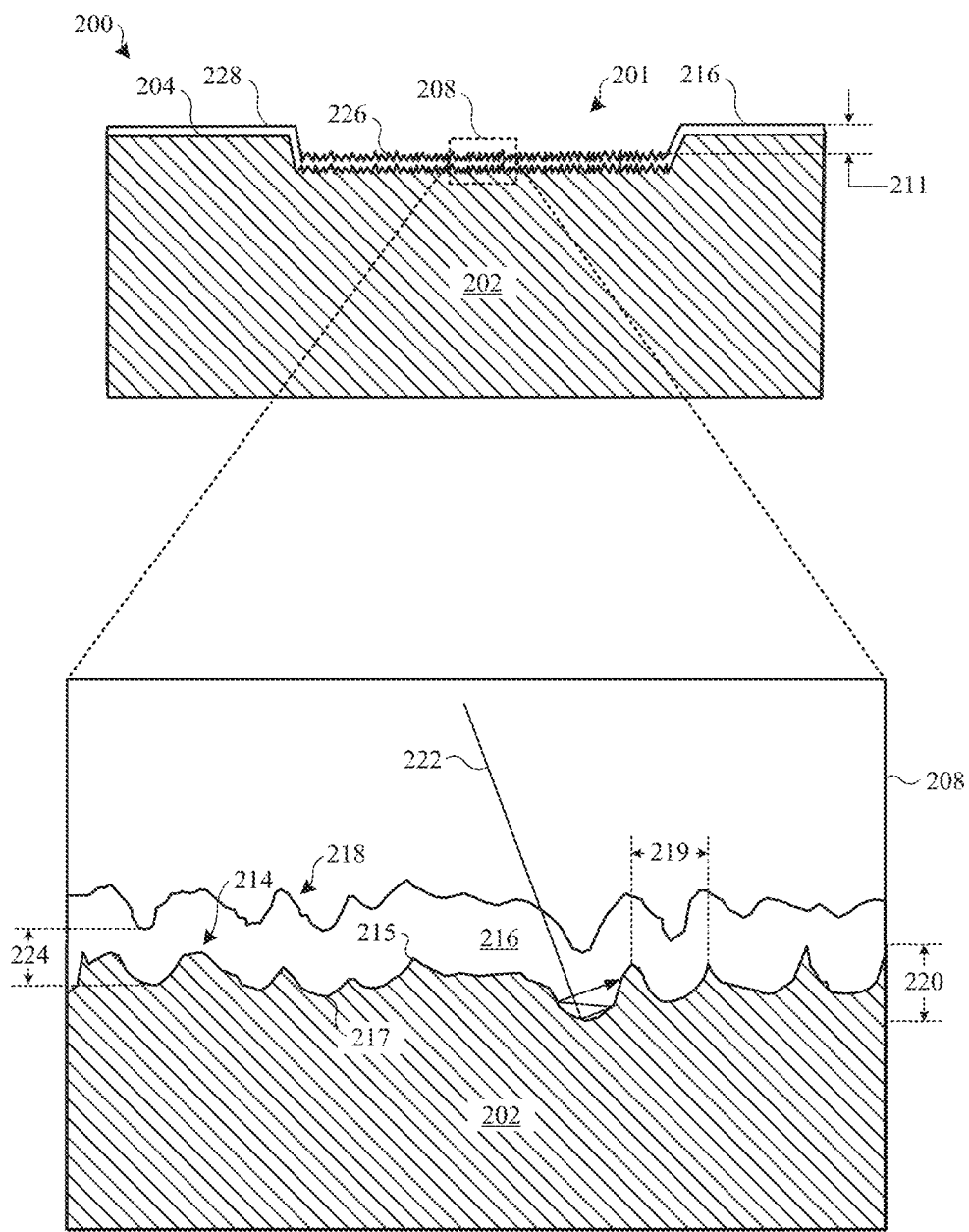

FIGS. 2A-2C show cross-section views of a portion of part 200 undergoing a laser marking process to form feature 201, in accordance with some embodiments. FIG. 2A shows substrate 202, which can be composed of any suitable anodizable metal. In some cases, substrate 202 is composed of aluminum. In some cases, substrate 202 is made of a 6000 series aluminum alloy. In some case, substrate 202 is made of a 7000 series aluminum alloy. It should be noted that 7000 series aluminum alloys contain relative high levels of zinc, which is associated with providing a higher tensile strength to the alloy compared to, for example, some 6000 series alloys. For instance, some 7000 series aluminum alloys include about 3 weight % zinc or higher. However, 7000 series alloys can be more susceptible to corrosion compared to some 6000 series alloys. Therefore, the laser marking techniques that provide a crack-free anodic film may be important for these more corrosion-prone aluminum alloys.

FIG. 2A shows substrate 202 after a laser marking process, where a laser beam impinges upon a surface 206 and does not impinge upon adjacent surface 204 of substrate 202. Thus, surface 206 can be referred to as a laser-affected area, and surface area 204 can be referred to as laser beam unaffected area. Surface area 204 that is unaffected by the laser beam can be polished to a mirror shine or textured surface (e.g., by a blasting process, a chemical etching process, or both). In some embodiments, surface area 204 that is unaffected by the laser beam has a roughness Ra ranging from about 0.5 nm to about 0.7 nm.

The laser beam has a power and pulse width suitable to burn or sinter substrate 202. In particular, heat from the laser beam locally heats surface 206 such that outermost portions of substrate 202 are oxidized in the ambient air. As shown in inset 208, this causes portions of substrate 202 to oxidize and become converted to oxide layer 210.

The laser beam energy and pulse width should be chosen to burn but not substantially ablate substrate 202. Laser ablation involves using laser beams generally having higher energy and/or smaller pulse widths such that a portion of the substrate is removed. In some cases, ablation involves using a picosecond laser (e.g., using a pulse width of about 10-15 picosecond between laser pulses). Laser ablation forms a relatively deep cavity within the substrate without substantial burning—thus, providing very little darkening. Once the laser-ablated surface is anodized, the laser-ablated area does not provide very much color contrast compared to adjacent surfaces (i.e., does not provide a very dark feature).

In order to form a feature 201 having more visual contrast (i.e., a darker feature), the laser beam is tuned so as to locally burn substrate 202 instead of ablating a portion of the substrate 202 away. In some embodiments, this is achieved by using a nanosecond laser. In some embodiments, the localized heating can be tuned by using an infrared (IR) nanosecond laser with a laser beam pulse width ranging from about 3 to about 5 nanoseconds—in some cases about 4 nanoseconds. However, other types of lasers with different energies and pulse widths may be used.

The resulting oxide layer 210 has a number of large voids 212 and has a rough quality due to the laser oxidizing process. Thus, oxide layer 210 can be referred to as a coarse oxide layer 212. This porous and rough quality gives coarse oxide layer 210 a very dark, matte appearance. In particular, incident light gets trapped within voids 212 and the rough surfaces within coarse oxide layer 210. In this way, coarse oxide layer 210 has a very dark (i.e., black) color that provides a good contrast to adjacent surface 204, which can have a specularly reflective and metallic appearance.

However, due to its porous and rough quality, coarse oxide layer 210 is easily detachable from substrate 202. Coarse oxide layer 210 can also inhibit anodization of substrate 202 during a subsequent anodizing process. Thus, although coarse oxide layer 210 has a dark (i.e., black or dark gray) color, coarse oxide layer 210 should be removed from substrate 202. It should be noted, however, that it can be difficult to remove coarse oxide layer 210 unless thickness 211 of coarse oxide layer 210 is below a prescribed thickness. For example, coarse oxide layer 210 having thickness 211 of greater than about 10 micrometers can be difficult to remove using chemical etching processes, which are sometimes preferred methods used during certain manufacturing processes.

Thickness 211 of coarse oxide layer 210 can be controlled by the laser pulse width of the laser beam. For example, using some laser systems, a laser pulse width of about 20 or higher can result in coarse oxide layer 210 having a thickness of about 20 micrometers or greater. Thus, the laser energy and duration between laser beam pulses should be tuned accordingly. In some cases, a nanosecond laser using a laser beam pulse width ranging from about 3 to about 5 nanoseconds (e.g., 4 nanoseconds), as described above, can achieve a thickness 211 of no greater than about 10 micrometers. Other factors related to the laser apparatus include the spot size of the laser beam. In some cases, a spot size of the laser beam ranges from about 10 to about 50 micrometers is used.

At FIG. 2B, substantially all of coarse oxide layer 210 is removed from substrate 202. Any suitable removal process can be used, including a chemical etching process. In some embodiments the removal process is integrated into an already existing manufacturing process that includes a pre-anodizing chemical etching process. In some manufacturing product lines, the chemical etching process includes exposing part 200 to an acidic solution. In other manufacturing product lines, the chemical etching process includes exposing part 200 to a basic solution. In other manufacturing product lines, the chemical etching process includes exposing part 200 to an acidic solution and a basic solution.

After coarse oxide layer 210 is removed, rough surface 214 of substrate 202 is exposed. Rough surface 214 retains some of the dark appearance due to its rough topology. In particular, rough surface 214 has alternating small peaks 215 and valleys 217. These small features trap incoming visible light, thereby giving rough surface 214 a dark appearance. Distance 219 between peaks 215, which can be referred to as pitch, should be small enough to prevent a majority of incoming light from being reflected back to an observer. In particular, some of the incident light, such as light ray 222, gets trapped between peaks 215 and does not reflect back to an observer. In general, the finer the pitch (e.g., distance between peaks 215), the more visible light that is trapped and the darker feature 201 will appear. In some applications, distance 219 should be less than about 30 micrometers in order to result in feature 201 having a sufficiently dark appearance compared to adjacent surface 204. In some embodiments, distance 219 less than about 30 micrometers results sufficiently dark and contrasting feature 201 (e.g., having dark gray appearance). In some embodiments, distance 219 of about 15 micrometers or less results in a sufficiently dark and contrasting feature 201. Rough surface 214 can also be characterized using roughness measurements. In some embodiments, rough surface 214 is characterized as having a roughness Ra of about 5 micrometers or less. In some embodiments, rough surface 214 is characterized as having a roughness Ra ranging from about 1 micrometer to about 10 micrometers.

In addition, distance 219 between peaks 215 is associated with the height 220 of peaks 215. In general, the greater distance 219 between peaks 215, the greater height 220 of peaks 215. In some embodiments, height 220 from peak 215 to valley 217 ranges from about 1 micrometer to about 30 micrometers. In a particular embodiment, height 220 ranges from about 5 micrometers and about 15 micrometers.

As a function of the laser marking process, distance 219 between peaks 215 is associated with depth 211 that feature 201 is recessed within substrate 202, with greater distance 219 between peaks 215 being associated with greater depth 211. In some embodiments, distance 219 between peaks 215 ranging from about 5 micrometers and about 20 micrometer is associated with depth 211 ranging from about 4 micrometers and about 8 micrometers.

It should be noted that the minimum distance 219 between peaks 215 could depend on limits of the laser process. In some cases distance 219 between peaks 215 even smaller than 30 micrometers, 15 micrometers, or 4 micrometers can be achieved, using, for example, a different laser or adjusting laser parameters or equipment. For example, some laser systems may be able to achieve distance 219 of less than about one micrometer. However, some laser system may make it difficult to achieve distance 219 less than about 400 nanometers. Thus, in some embodiments, distance 219 is greater than about 400 nanometers and less than about one micrometer. In some embodiments, this range of distance 219 gives feature 201 a dark gray appearance. In some embodiments, distance of less than about 400 nanometers can be achieved, resulting in an even darker appearing feature 201.

FIG. 2C shows part 200 after an anodizing process, whereby a portion of substrate 202 is converted to oxide layer 216. Oxide layer 216 can be referred to as an anodic layer, oxide film, anodic film, or other suitable term. Oxide layer 216 is composed of an oxide of an anodizable metal within substrate 202. For example, substrate 202 composed of aluminum or an aluminum alloy will result in an aluminum oxide layer 216. Unlike coarse oxide layer 210 described above with reference to FIG. 2A, oxide layer 216 does not have a rough structure and does not have a dark appearance. In some cases, oxide layer 216 has a number of anodic pores, which are elongated columnar-shaped pores having diameters on the scale of tens of nanometers. In some embodiments, oxide layer 216 is preferably transparent, or partially transparent, to visible light.

Any suitable anodizing process can be used. In some cases, the type of anodizing process and the process parameters will depend on the material of substrate 202. In some embodiments where substrate 202 is aluminum or aluminum alloy, the anodizing process is a Type II anodizing process, as defined by Military Specification Mil-A-8625. Type II anodizing generally involves anodizing in an electrolyte having sulfuric acid, and can result in an oxide layer 216 being relatively transparent. In some embodiments, it is desirable for oxide layer 216 to be at least partially transparent to visible light such that underlying substrate 202 is visible through oxide layer 216. In some applications, it may be beneficial to include more than one type of acid within the electrolytic bath, or to perform multiple anodizing processes. Thickness 224 of oxide layer 216 will depend on application requirements and on limitations of the anodizing process. In some embodiments, thickness 224 ranges from about from about 5 micrometers and about 20 micrometers.

Since anodizing is a conversion process, surface 214 of substrate 202 corresponds to an interface between oxide layer 216 and substrate 216. Furthermore, surface 214 of substrate 202 (also referred to as interface 214) will generally maintain its rough topology. That is, rough surface 214 will still have alternating peaks 215 and valleys 217 that are separated by distance 219, with peaks 215 having a height 220. Thus, rough surface 214 will retain its dark appearance. Moreover, feature 201 is still recessed. In particular, exterior surface 226 of oxide layer 216 within feature 201 is recessed with respect to exterior surface 228 of oxide layer 216 adjacent to feature 201. In addition, the topology of exterior surface 226 of oxide layer 216 will generally correspond to the topology of rough surface 214.

As described above, the topology of rough surface 214 of substrate 202 within the area of feature 201 can cause feature 201 to have a dark appearance relative to adjacent surface 204 of substrate outside of feature 201. That is, if oxide layer 216 is substantially transparent to visible light, at least some light will pass through oxide layer 216 and impinge upon rough surface 214. For example, light ray 222 will pass through oxide layer 216, become between peaks 215 and will not reflect back to an observer. In this way, the dark appearance of feature 201 is preserved. In some embodiments, distance 219 is less than about 30 micrometers. In some embodiments, distance 219 is about 15 micrometers or less. In some embodiments distance 219 is less than about one micrometer. In some embodiments, distance 219 is greater than about 400 nanometers.

Also as described above, height 220 of peaks and depth 211 of feature 201 can be associated with distance 219 between peaks 215. In some embodiments, depth 211 of feature 201 ranges from about 4 micrometers and about 8 micrometers when distance 219 between peaks 215 ranges from about 5 micrometers and about 20 micrometer. In some embodiments, a distance 219 between peaks 215 ranging from about 5 micrometers and about 20 micrometers is associated with height 220 from peak 215 to valley 217 ranging from about 1 micrometer and about 30 micrometers. In a particular embodiment, a distance 219 between peaks 215 ranging from about 5 micrometers and about 20 micrometers is associated with height 220 from peak 215 to valley 217 ranging from about 5 micrometers and about 15 micrometers.

Since the anodizing process is performed after the laser marking process, oxide layer 216 has no laser-induced cracks. Thus, oxide layer 216 protects substrate 202 from water and other chemical agents better than a laser-treated anodic film using conventional laser marking or engraving processes. This can be especially important if substrate 202 is composed of a metal that is susceptible to corrosions. For instance, some aluminum alloys are more susceptible to corrosion than other aluminum alloys. For instance, some 7000 series aluminum alloys, which are known for their high tensile strength, can be more susceptible to corrosion due to their higher amounts of zinc compared to some 6000 series aluminum alloys, which generally have lower tensile strength than 7000 series aluminum alloys.

FIGS. 3A-3C show scanning electron microscope images of a laser marked part before and after an anodizing process, in accordance with some embodiments. FIG. 3A shows a cross-section view of substrate 302 after a laser marking process that was used to form feature 301 within substrate 302. As shown, feature 301 is recessed relative to adjacent surface 304. FIG. 3B shows a close-up cross-section view of surface portion of feature 201. As shown, the laser-marking process forms coarse oxide layer 310 (labeled as "laser engraved layer") on substrate 302. Coarse oxide layer 310 has an uneven topology and a number of micro-voids that trap incoming light and make coarse oxide layer 310 have a dark appearance.

Although providing a desirable visibly dark appearance, coarse oxide layer 310 is relatively easy to separate from substrate 302 and inhibits a subsequent anodizing process. Thus, coarse oxide layer 310 is removed prior to anodizing. FIG. 3C shows part 300 after an anodizing process that converts surface portions of substrate 302 to oxide layer 316 (labeled as "anodized layer"). Substrate 302 retains a rough surface topology having a series of alternating peaks 315 and valleys 317 as a result of the laser marking process. Distance 319 between peaks 315, which can be referred to as pitch, should be small enough to prevent a majority of incoming light from being reflected back to an observer. For example, distance 319 can be 30 micrometers or less, in some cases, 15 micrometers or less. This gives feature 301 a dark appearance.

Figure 4:
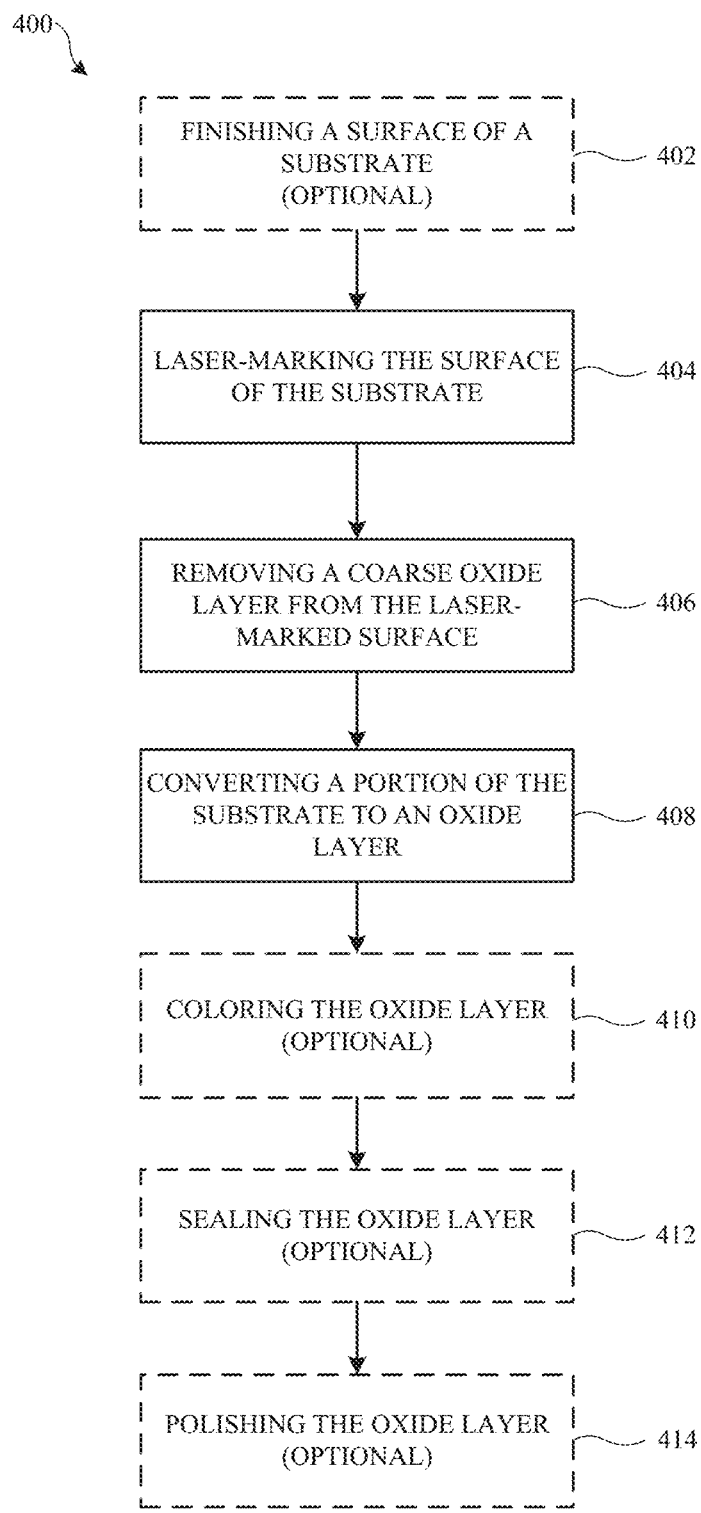
FIG. 4 shows a flowchart indicating a process for forming a feature in an anodized substrate, in accordance with some embodiments.

FIG. 4 shows flowchart 400 indicating a process for forming a feature on a part, in accordance with some embodiments. At 402, a surface of a substrate is optionally finished using one or more finishing processes. In some embodiments, the finishing process involves one or more polishing and etching processes. In one embodiment, the substrate is mechanically polished and chemically polished. In another embodiment, the substrate is mechanically polished then textured using one or more blasting and chemical etching processes. In some embodiments, the surface of the substrate has a surface roughness Ra ranging from about 1 micrometer to about 10 micrometers.

At 404, a feature is formed on the surface of the substrate by laser-marking a predetermined surface area of the substrate. In some embodiments, the feature is in the form of text, logo or symbol. The pulse width of the laser beam should provide a high enough energy to cause local oxidation of the substrate, thereby forming a coarse oxide layer. However, the laser beam should provide a low enough energy to prevent formation of a coarse oxide layer having a thickness too large to be removed by a subsequent oxide removal process.

The coarse oxide layer is a highly porous oxide material that appears visibly dark compared to adjacent surfaces of the substrate that are unmarked form the laser process. In some cases, coarse oxide layer 210 has a black or grey color. The dark color of the coarse oxide layer is due to its rough, porous structure.

In some embodiments, distance 219 between peaks 215 should be less than about one micrometer in order to sufficiently trap incident light and create a sufficiently dark appearance for feature 201. The minimum distance 219 between peaks 215 can depend on limits of the laser process. For example, some laser systems may make it is difficult to achieve distance 219 less than about 500 nanometers. Thus, in some embodiments, distance 219 is greater than about 500 nanometers less than about one micrometer. This surface topology acts by trapping incident light between peaks 215.

At 406, the coarse oxide layer is removed from the laser-marked area of the substrate using, for example, a chemical etching process. This process reveals a rough surface of the substrate which retains some of the light-absorbing properties of the coarse oxide layer. In particular, the rough surface has a series of peaks and valleys, with a distance between the peaks (also referred to as pitch) being sufficiently small so as to absorb a significant portion of incident visible light. In some cases, the distance between the peaks is less than about 30 micrometers. However, in some cases, smaller distances between peaks can be achieved, using, for example, a different laser or adjusting laser parameters at step 404. For example, in some cases a distance between peaks of less than about one micrometer can be achieved, resulting in an even darker appearing feature. In some embodiments, the rough surface has a roughness Ra of about 10 micrometers or less.

At 408, the substrate is exposed to an anodizing process, whereby a portion of the substrate is converted to corresponding oxide layer. In some cases, a Type II anodizing process is used. Since the anodizing process is a conversion and conformal process, the underlying substrate retains the rough surface topology prior to anodizing. In particular embodiments, the rough surface of the underlying substrate has a roughness Ra of about 10 micrometers or less. In some cases, the oxide layer is transparent enough that the rough surface of the underlying substrate is visible through the oxide layer. Thus, the feature retains its dark color and also has a protective oxide coating.

Since the anodizing process is performed after the laser marking process, the oxide layer is free from cracks related to a conventional laser marking process where an anodizing process is performed prior to a laser marking. Since the oxide layer is free from such cracks, the oxide layer provides unbroken protection across the entire area of the feature. In this way, the substrate is better protected from exposure to water or other chemical agents that may corrode the substrate compared to conventional laser marked anodized substrates.

At 410, the oxide layer is optionally colored using one or more colorants. For example, a colorant can be infused within anodic pores of the oxide layer. Note that the anodic pores are formed during the anodizing process are different from the pores of the coarse oxide layer. In particular, the anodic pores generally have an elongated shape compared to the irregular shaped pores within the coarse oxide layer. The anodic pores typically have a diameter in the scale of tens of nanometers. In a particular embodiment where a Type II anodizing process is used, the pores have diameters ranging from about 10 nanometers (nm) to about 50 nm. These anodic pores can be infused with one or more colorants, such as one or more dyes, metals or pigments, which imparts a desired color to the oxide layer. In some cases, only the areas of the oxide layer that are not laser-marked are colored while the laser marked area (the feature) is not colored.

At 412 the oxide layer is optionally sealed using a sealing process. In some cases, the sealing process involves immersing the part in a hot aqueous solution so as to hydrate the oxide material, which cases pore walls of the oxide layer to swell and close. This can increase the corrosion resistant properties of the oxide layer and can also trap in any colorant that is infused within the pores.

At 414 the oxide layer is optionally polished such that an exterior surface of the oxide layer has an even topology. This can give the oxide layer a shiny and specularly reflective surface quality. In some cases, only the areas of the oxide layer that are not laser-marked are polished while the laser marked area (the feature) is not polished. In some cases, the oxide layer is polished prior to the sealing process. In other embodiments, the oxide layer is sealed prior to the oxide polishing process.

The foregoing description, for purposes of explanation, uses specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A part for a portable electronic device, the part comprising:
   a substrate defining an external surface having a feature, the feature comprising:
      walls that extend from the external surface and terminate at a bottom surface, the feature extending into the external surface a depth of no more than about 10 micrometers; and
      a series of peaks separated by valleys disposed on the bottom surface, the bottom surface having a surface roughness (Ra) of 1 to 10 micrometers; and
   an anodic layer overlaying the feature.

2. The part of claim 1, wherein a separation distance between the peaks and the valleys is between 1 micrometer and 30 micrometers.

3. The part of claim 1, wherein the feature extends into the external surface by a depth ranging from 4 micrometers to 8 micrometers.

4. The part of claim 1, wherein a separation distance between the peaks is less than 1 micrometer.

5. The part of claim 4, wherein the separation distance between the peaks is greater than 400 nanometers.

6. The part of claim 1, wherein the anodic layer has a hardness of at least 300 HV.

7. The part of claim 1, wherein the anodic layer has a thickness ranging from 5 micrometers to 20 micrometers.

8. The part of claim 1, wherein the part corresponds to an enclosure for an electronic device, and an outer surface of the anodic layer corresponds to an outer surface of the enclosure.

9. The part of claim 1, wherein the substrate comprises an aluminum alloy.

10. A method of forming a feature on a part, the method comprising:
   forming a feature on an external surface of a substrate, wherein the feature is partially defined by walls that extend from the external surface and terminate at a bottom surface, the feature extending into the substrate a depth of no more than about 10 micrometers;
   forming an oxide layer over the external surface of the substrate using a laser beam;
   removing the oxide layer to expose the external surface; and
   forming an anodic layer that overlays the feature, wherein the feature comprises a series of peaks and valleys disposed on the bottom surface, and a distance between the peaks is between 400 nanometers to 300 micrometers.

11. The method of claim 10, wherein the laser beam is produced by a nanosecond laser.

12. The method of claim 11, wherein a pulse width of the laser beam ranges from 3 nanoseconds to 5 nanoseconds.

13. The method of claim 10, wherein a spot size of the laser beam ranges from 10 micrometers to 50 micrometers.

14. The method of claim 10, wherein the feature extends into the substrate by a depth ranging from 4 micrometers to 8 micrometers.

15. An enclosure for an electronic device, the enclosure comprising:

an aluminum substrate defining an external surface comprising a feature, the feature comprising:
walls that extend from the external surface and terminate at a bottom surface such that the feature extends into the aluminum substrate at a depth of no more than about 10 micrometers; and
a series of peaks separated by valleys disposed on the bottom surface, wherein a distance between the peaks is between 400 nanometers to 300 micrometers; and
an anodic layer overlaying the feature.

16. The enclosure of claim 15, wherein the feature extends into the aluminum substrate at a depth between 4 micrometers to 8 micrometers.

17. The enclosure of claim 15, wherein the feature is at least one of a text, logo or symbol.

18. The enclosure of claim 15, wherein the aluminum substrate comprises an aluminum alloy.

19. The enclosure of claim 18, wherein the aluminum alloy is a 7000 series aluminum alloy.

20. The enclosure of claim 15, wherein the anodic layer has a thickness ranging from 5 micrometers to 20 micrometers.

\* \* \* \* \*